(12) United States Patent
Abe et al.

(10) Patent No.: US 7,358,889 B2
(45) Date of Patent: Apr. 15, 2008

(54) OBJECT DETECTION SYSTEM AND METHOD OF DETECTING OBJECT

(75) Inventors: Kyoichi Abe, Susono (JP); Setsuo Tokoro, Susono (JP); Koji Suzuki, Susono (JP)

(73) Assignee: Toyota Jidosha Kabushiki Kaishi, Toyota-shi, Aichi-ken (JP)

( * ) Notice: Subject to any disclaimer, the term of this patent is extended or adjusted under 35 U.S.C. 154(b) by 289 days.

(21) Appl. No.: 10/560,307

(22) PCT Filed: Sep. 9, 2004

(86) PCT No.: PCT/IB2004/002931

§ 371 (c)(1),
(2), (4) Date: Dec. 12, 2005

(87) PCT Pub. No.: WO2005/024464

PCT Pub. Date: Mar. 17, 2005

(65) Prior Publication Data

US 2006/0139204 A1 Jun. 29, 2006

(30) Foreign Application Priority Data

Sep. 11, 2003 (JP) ............................. 2003-320077

(51) Int. Cl.
*G01S 13/86* (2006.01)
*G01S 13/93* (2006.01)
(52) U.S. Cl. ..................... 342/70; 342/189; 342/66; 342/27; 342/52
(58) Field of Classification Search .................. 342/70
See application file for complete search history.

(56) References Cited

U.S. PATENT DOCUMENTS 5,633,705 A 5/1997 Asayama (Continued)

FOREIGN PATENT DOCUMENTS

DE 101 33 945 A1 2/2003

(Continued)

OTHER PUBLICATIONS

Srinivasa et al. "A Fusion System for Real-Time Forward Collision Warning in Automobiles". 2003 IEEE Proceedings on Intelligent Transportation Systems. vol. 1. Oct. 12-15, 2003. pp. 457-462.*

*Primary Examiner*—Thomas H. Tarcza
*Assistant Examiner*—Matthew M Barker
(74) *Attorney, Agent, or Firm*—Finnegan, Henderson, Farabow, Garrett & Dunner, LLP.

(57) ABSTRACT

An object detection system is provided with radar detection means (2), image detection means (3), and collating means (4). The collating means (4) detects a combination of an object detected by the radar detection means (2) and an object selected among those detected by the image detection means (3), which is the closest to the object detected by the radar detection means (S1, S2), detects a combination of an object detected by the image detection means (3) and an object selected among those detected by the radar detection means (2), which is the closest to the object detected by the image detection means (S3, S4), and determines when there is a coincidence between the combination of the object detected by the radar detection means (2) and the selected object as being closest thereto and the combination of the object detected by the image detection means (3) and the selected object as being closest thereto, that the object detected by the radar detection means (2) is the same as the object detected by the image detection means (S5).

6 Claims, 3 Drawing Sheets

U.S. PATENT DOCUMENTS

| | | |
|---|---|---|
| 6,414,712 B1 * | 7/2002 | Wanielik et al. ............ 348/118 |
| 6,492,935 B1 | 12/2002 | Higuchi |
| 6,590,521 B1 * | 7/2003 | Saka et al. .................... 342/70 |
| 6,670,910 B2 * | 12/2003 | Delcheccolo et al. ......... 342/70 |
| 6,862,537 B2 * | 3/2005 | Skrbina et al. ............... 702/32 |
| 7,012,560 B2 * | 3/2006 | Braeuchle et al. ............ 342/70 |
| 2003/0011509 A1 * | 1/2003 | Honda ........................ 342/70 |
| 2003/0060956 A1 | 3/2003 | Rao et al. |
| 2004/0066285 A1 * | 4/2004 | Sekiguchi ................... 340/435 |
| 2004/0178945 A1 * | 9/2004 | Buchanan .................... 342/70 |
| 2004/0189512 A1 * | 9/2004 | Takashima et al. ........... 342/70 |
| 2004/0247157 A1 | 12/2004 | Lages |
| 2005/0125126 A1 * | 6/2005 | Yopp .......................... 701/45 |

FOREIGN PATENT DOCUMENTS

| | | |
|---|---|---|
| EP | 1 338 477 A2 | 8/2003 |
| JP | 07-125567 | 5/1995 |
| JP | 8-329393 | 12/1996 |
| JP | 2003-84064 | 3/2003 |
| JP | 2003-99762 | 4/2003 |
| JP | 2003-168197 | 6/2003 |
| WO | WO 02/103385 A1 | 12/2002 |

* cited by examiner

OBJECT DETECTION SYSTEM AND METHOD OF DETECTING OBJECT

BACKGROUND OF THE INVENTION

Field of Invention

The invention relates to an object detection system and a method of detecting an object that detects an object by means of radar and images.

Recently an operation support system, for example, a collision avoidance control system, an adaptive cruise control system, a tracking control system and the like has been increasingly developed. The detection of an object (obstruction) such as a preceding vehicle is essential for the operation support system. An object detection system disclosed in publications JP-A-2003-84064 and JP-A-7-125567 as below includes two detection units, for example, a radar such as a laser radar, and a stereo camera that shoots an image. The object detection system performs collation between the detection results of the radar and the detected image. The preceding object is detected based on the aforementioned collation results.

In the generally employed object detection system, each of two kinds of detection units detects an object that is considered as being existent. In other words, the object detection system may occasionally detect a plurality of objects as the preceding object. In this type of object detection system, the collation of the detection results is performed in one-way process, that is, the detection result of one detection unit is collated with respect to the detection result of the other detection unit so as to identify the object. The collation in the inverted process, however, is not performed. This may cause the object detection system to mistakenly identify a plurality of objects. The thus identified pluralities of objects have to be further subjected to the process for narrowing into the single object by performing complicated operations. Even if the operation is performed, the identified objects may not be narrowed into the single object.

SUMMARY OF THE INVENTION

It is an object of the invention to provide an object detection system and a method of detecting an object capable of detecting an object through a simple process with high accuracy.

An object detection system according to the invention is provided with radar detection means that detects an object using radar, image detection means that detects an object using an image, and collating means that performs collation between a detection result of the radar detection means and a detection result of the image detection means. The collating means detects a combination of an object detected by the radar detection means and an object selected among those detected by the image detection means, which is the closest to the object detected by the radar detection means, detects a combination of an object detected by the image detection means and an object selected among those detected by the radar detection means, which is the closest to the object detected by the image detection means, determines whether there is a coincidence between the combination of the object detected by the radar detection means and the selected object as being closest thereto and the combination of the object detected by the image detection means and the selected object as being closest thereto, and determines, when there is the coincidence, that the object detected by the radar detection means is the same as the object detected by the image detection means.

A method of detecting an object in a system according to the invention is provided with radar detection means that detects an object using a radar, image detection means that detects an object using an image, and collating means that performs collation between a detection result of the radar detection means and a detection result of the image detection means. The method comprises the steps of detecting a combination of an object detected by the radar detection means and an object selected among those detected by the image detection means, which is the closest to the object detected by the radar detection means, detecting a combination of an object detected by the image detection means and an object selected among those detected by the radar detection means, which is the closest to the object detected by the image detection means, determining whether there is a coincidence between the combination of the object detected by the radar detection means and the selected object as being closest thereto and the combination of the object detected by the image detection means and the selected object as being closest thereto, and determining, when there is the coincidence, that the object detected by the radar detection means is the same as the object detected by the image detection means.

In the above-structured object detection system and method, the object is detected by both the radar detection means and the image detection means. All the detection results of the image detection means are collated with respect to the respective objects detected by the radar detection means by the collation means. The collation means then selects the object among those detected by the image detection means as being the closest to the object detected by the radar detection means. The object among those detected by the radar detection means is combined with the selected object that is the closest thereto. All the detection results of the radar detection means are collated with respect to the respective objects detected by the image detection means by the collation means. The collation means then selects the object among those detected by the radar detection means as being the closest to the object detected by the image detection means. The object among those detected by the image detection means is combined with the selected object that is the closest thereto. It is determined whether there is a coincidence between the combination of the object detected by the radar detection means and the selected object as being closest thereto and the combination of the object detected by the image detection means and the selected object as being closest thereto. When there is the coincidence, it is determined that the object detected by the radar detection means is the same as the object detected by the image detection means. Accordingly the object included in the coincident combinations is judged as being the one to be detected by the object detection system. In the object detection system, the detection results of two kinds of detection means are collated bilaterally so as to select only one object among those detected by one detection means collated with respect to the object detected by the other detection means in the respective collating processes. Further the object that satisfies AND condition between the aforementioned combinations is set as the object to be detected by the object detection system, resulting in high detection accuracy. In the object detection system, the object among those detected by one detection means which is closest to the object detected by the other detection means is selected to form the respective combinations. It is then determined whether there is a coincidence between the combinations. Accordingly the object to be detected by the object detection system may be easily identified based on detection results of the aforementioned two types of detection means through the simple process as described above while reducing the processing load.

A millimeter-wave radar, laser radar and the like may be used as the radar detection means. A stereo camera may be used as the image detection means.

According to the aspect of the invention, the determination whether each detection result of the radar detection means and the image detection means indicates the identical object to be detected by the object detection system may be made with high accuracy using a simple collating process.

BRIEF DESCRIPTION OF THE DRAWINGS

The foregoing and ether objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
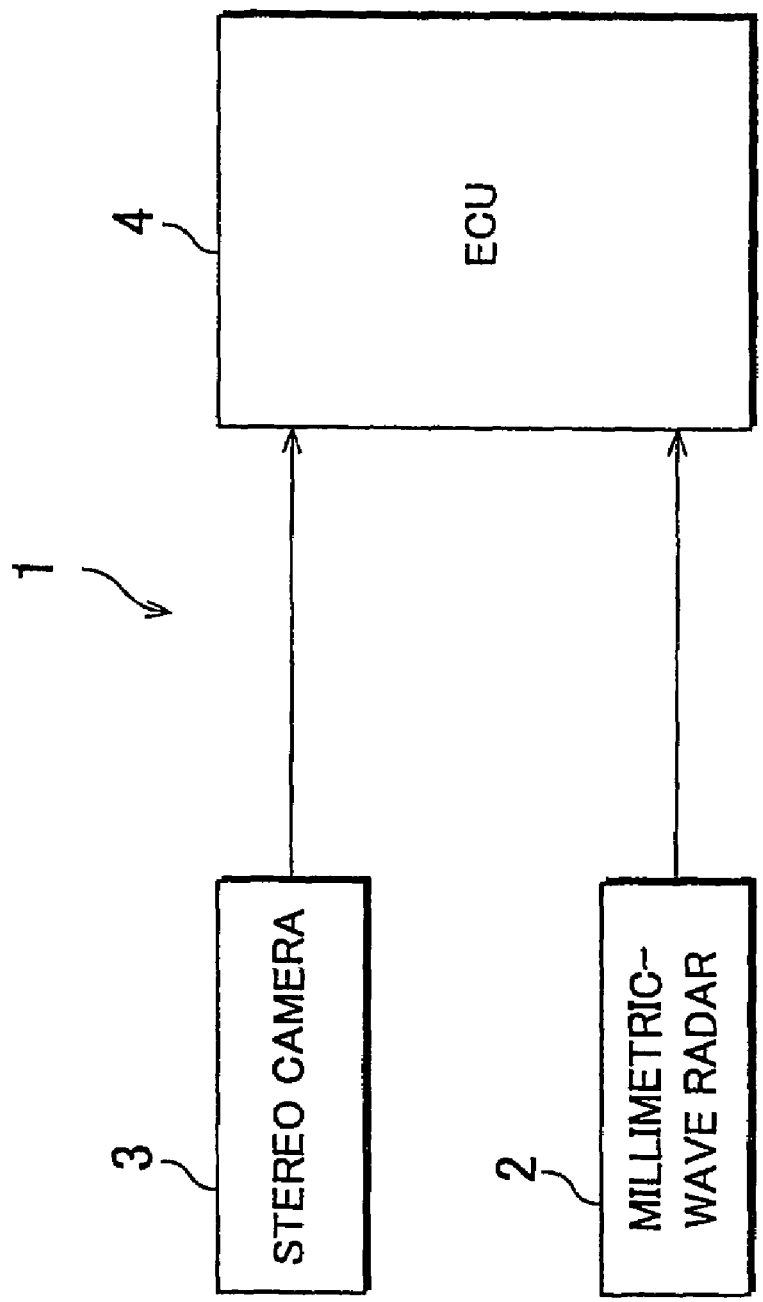
FIG. 1 is a view that shows a structure of an obstruction detection system as an embodiment according to the invention.

An embodiment of the object detection system according to the invention will be described referring to the drawings.

In this embodiment, the object detection system according to the invention is applied to an obstruction detection system provided in a vehicle so as to detect an obstruction that precedes the vehicle. The obstruction detection system according to this embodiment is provided with two detection units, that is, a millimeter-wave radar and a stereo camera Referring to FIG. 1, an obstruction detection system 1 will be described. FIG. 1 shows a structure of the obstruction detection system according to this embodiment.

The obstruction detection system 1 is provided in a vehicle and detects an obstruction, that is, a vehicle or the like that precedes the vehicle. The obstruction detection system 1 functions in providing obstruction information to the operation support system such as a collision avoidance control system, an adaptive cruise control system, a tracking control system and the like, which requires the information with respect to the preceding obstruction. In the obstruction detection system 1, each detection result of two detection units is collated through a simple process such that the obstruction that precedes the vehicle is identified with high accuracy. The obstruction detection system, thus, is provided with a millimeter-wave radar 2, a stereo camera 3, and an ECU 4 (Electronic Control Unit). The obstruction detection system 1 may be provided independently from the operation support system. That is, it may be structured to transmit the detected obstruction information to the operation support system. Alternatively the obstruction detection system may be assembled with the operation support system.

In this embodiment, the millimeter-wave radar 2 corresponds the radar detection unit, the stereo camera 3 corresponds the image detection unit, and the ECU 4 corresponds the collating unit.

In this embodiment, a millimetric-wave object refers to an object detected by the millimeter-wave radar 2, and an image object refers to an object detected by the stereo camera 3. A fusion object refers to the object identified as the one that has been detected by the millimeter-wave radar 2 and the stereo camera 3 through collation between the millimetric-wave object and the image object. It serves as the obstruction information supplied by the obstruction detection system 1. The independent millimetric-wave object represents the object that is detected by the millimeter-wave radar 2 only. In other words, the independent millimetric-wave object is obtained by excluding the fusion object from the millimetric-wave objects. The independent image object represents the object that is detected by the stereo camera 3 only. In other words, the independent image object is obtained by excluding the fusion object from the image objects. The respective objects exhibit the information with respect to the distance between the vehicle and the preceding obstruction, the relative speed of the obstruction with respect to the vehicle, the angle defined by the obstruction and the running direction of the vehicle (information of the lateral position) for determining the position of the obstruction with respect to the vehicle.

The millimeter-wave radar 2, radar for detecting an object using a millimetric wave, is attached in the center of a front surface of the vehicle. The millimeter-wave radar 2 scans the millimetric wave on the horizontal plane so as to be emitted from the vehicle forward, and receives the reflected millimetric wave. The millimeter-wave radar 2 measures the time period elapsing from the emission to the receipt of the millimetric wave such that the distance from the front end of the vehicle to the preceding object is calculated. The millimeter-wave radar 2 further calculates a relative speed of the vehicle with respect to that of the preceding object using Doppler Effect. The millimeter-wave radar 2 detects the direction of the millimetric wave that reflects most intensely, based on which an angle defined by the traveling direction of the vehicle and that of the preceding object is calculated. The millimeter-wave radar 2 is capable of detecting the object upon receipt of the reflecting millimetric wave. At every receipt of the reflecting millimetric wave, therefore, one millimetric object is obtained. The millimeter-wave radar 2 serves to calculate the distance, the relative speed, and the angle. However, the ECU 4 may be structured to calculate those values based on detection results of the millimeter-wave radar 2.

The millimeter-wave radar 2 is capable of detecting the distance and the relative speed with relatively higher accuracy, but detecting the angle with relatively lower accuracy. As the millimeter-wave radar 2 calculates the distance based on the time elapsing from emission of the millimetric wave to reflection thereof, the accuracy in the calculated distance is relatively higher. As the relative speed is calculated using Doppler effect, the resultant value of the relative speed exhibits high accuracy. The millimeter-wave radar 2 fails to identify the point at which the millimetric wave reflects most intensely in the width direction of the object. As a result, the position in the width direction (lateral position) is likely to fluctuate, reducing accuracy in the angle.

The stereo camera 3 includes two sets of CCD cameras (not shown), which are arranged apart at a distance of approximately several 10 cm in the horizontal direction. The stereo camera 3 is also attached in the center of the front surface of the vehicle. The stereo camera 3 transmits the respective image data shot by those two CCD cameras to an image processing portion (not shown). The image processing portion may be assembled with the stereo camera 3 or formed within the ECU 4.

The image processing portion identifies the object based on the respective image data, and obtains the positional information with respect to the object. The stereo camera 3 is capable of detecting the object when the object is identified based on two image data. At every identification of the object, one image object is obtained. The image processing portion calculates the distance from the front end of the vehicle to the preceding object by triangulation using the difference in views of the object between two image data. The image processing portion calculates the relative speed based on the change in the calculated distance as an elapse of time. The image processing portion detects both ends of the detected object in the width direction such that each angle defined by the traveling direction of the vehicle and the respective ends of the object is calculated. Accordingly the lateral positional information of the image object includes two types of angle information with respect to both ends of the object in the width direction.

Each detection result of the distance and the relative speed of the stereo camera 3 exhibits relatively lower accuracy but the detection result of the angle exhibits relatively higher accuracy. As both ends of the object in the width direction can be detected with high accuracy based on the left and right image data, the detection result with respect to the angle may exhibit high accuracy. However, as the image data are supplied from left and right CCD cameras apart at several 10 cms, the triangulation is performed at substantially acute angle for calculating the distance. Accordingly, each accuracy of the distance and the relative speed is reduced.

The ECU 4, that is, electronic control unit, includes a CPU (Central Processing Unit), a ROM (Read Only Memory), a RAM Random Access Memory), and the like. The ECU 4 is connected with a millimeter-wave radar 2 and a stereo camera 3. The ECU 4 receives the millimetric-wave object from the millimeter-wave radar 2, and the image object from the stereo camera 3. Then the ECU 4 performs collation between the millimetric-wave object and the image object so as to obtain obstruction information, for example, fusion object, independent millimetric-wave object, independent image object. The ECU 4 receives the image data from the stereo camera 3, based on which the image object is obtained.

Figure 2:
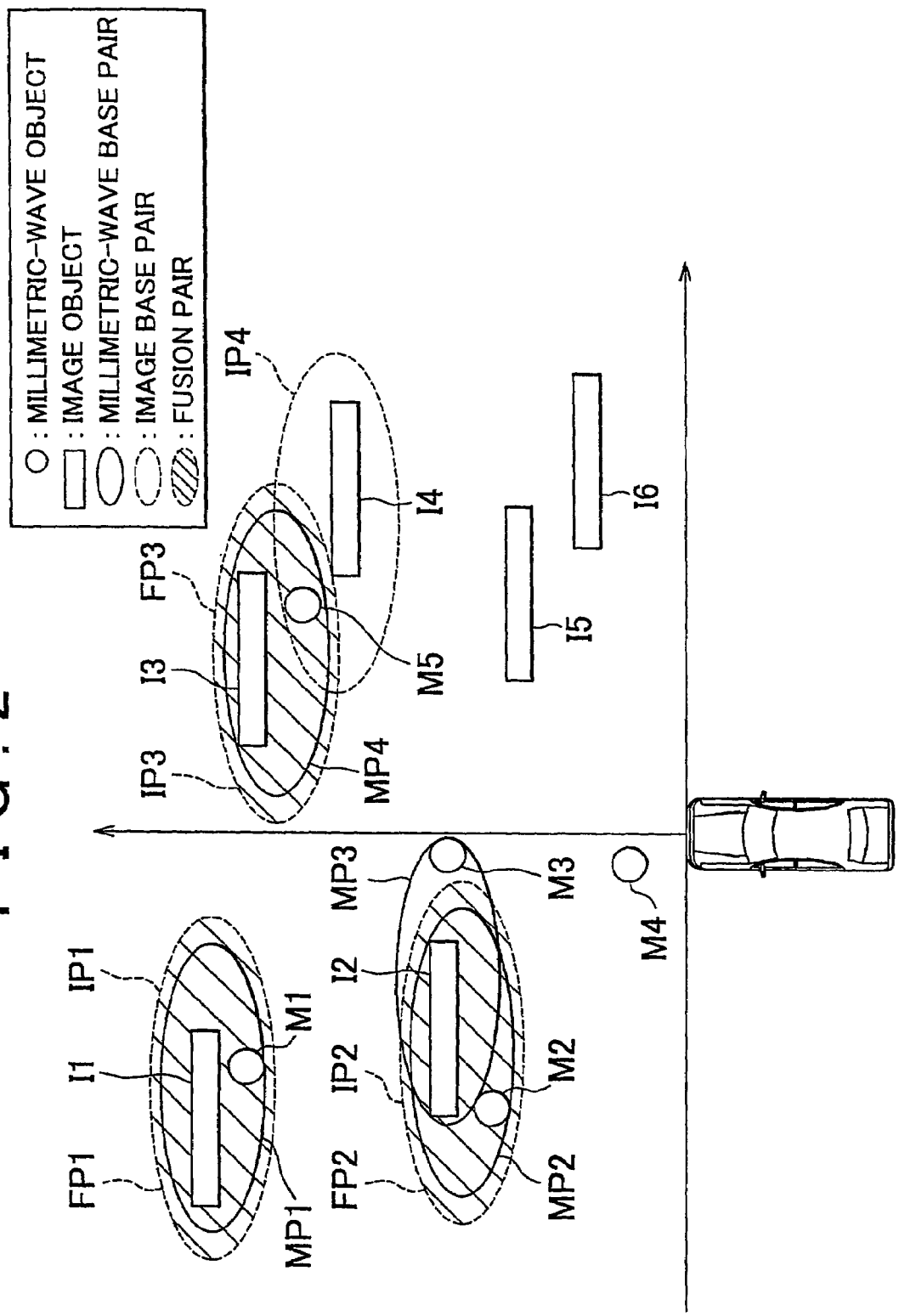
FIG. 2 is an explanatory view representing the collating process between objects detected by a radar detection unit as a millimeter-wave radar and objects detected by an image detection unit as a stereo camera, which are provided in an obstruction detection system as shown in FIG. 1.

Referring to FIG. 2, the collating process executed by the ECU 4 will be described. FIG. 2 is a view that represents the process for performing collation between the millimetric-wave objects and the image objects. The example shown in FIG. 2 indicates five millimetric-wave objects M1 to M5 detected by the millimeter-wave radar 2, and six image objects I1 to I6 detected by the stereo camera 3.

If the millimetric-wave objects by the number of n_m are detected by the millimeter-wave radar 2, the ECU 4 fetches each of the millimetric-wave objects one by one. The ECU 4 then collates each of the image objects by the number of n_i with respect to the fetched millimetric-wave object sequentially such that the image object closest to the fetched millimetric-wave object is selected. In this case, the distance between the vehicle and the object and the angle defined by the vehicle and the object are collated, and, if required, the relative speed of the object with respect to the vehicle may also be collated. In this example, the difference between the distance from the fetched millimetric-wave object to the vehicle and the distance from the closest image object to the vehicle is set as a threshold value (several meters) in accordance with the accuracy of the millimeter-wave radar 2 for the purpose of performing the distance collation. If the aforementioned difference in the distance is equal to or larger than the threshold value, the closest image object cannot be selected. In this example, the difference between the angle defined by the fetched millimetric object and the traveling direction of the vehicle and the angle defined by the closest image object and the traveling direction of the vehicle is set as a threshold value (several degrees) in accordance with the millimeter-wave radar 2 for the purpose of performing the angle collation. If the aforementioned difference in the angle is equal to or larger than the threshold value, the closest image object cannot be selected. If the closest image object is selected, the ECU 4 stores a pair of the fetched millimetric-wave object and the selected image object closest as a millimetric-wave base pair. The ECU 4 repeats the aforementioned collation with respect to the millimetric-wave objects by n_m times.

In the example shown in FIG. 2, when a millimetric-wave object M1 is fetched as the reference, an image object I1 is selected such that a millimetric-wave base pair MP1 is determined. When a millimetric-wave object M2 is fetched as the reference, an image object I2 is selected such that a millimetric-wave base pair MP2 is determined. When a millimetric-wave object M3 is fetched as the reference, an image object I2 is selected such that a millimetric-wave base pair MP3 is determined. When a millimetric-wave object M4 is fetched as the reference, any one of the image objects I1 to I6 cannot be selected to form the millimetric-wave base pair because each distance between the respective image objects I1 to I6 and the millimetric-wave object M4 exceeds the threshold value. When a millimetric-wave object M5 is fetched as the reference, an image object I3 is selected such that a millimetric-wave base pair MP4 is determined.

If the image objects by the number of n_i are detected by the stereo camera 3, the ECU 4 fetches each of the image objects one by one. The ECU 4 then collates each of millimetric-wave objects by the number of n_m with respect to the fetched image object sequentially such that the millimetric-wave object closest to the fetched image object is selected. Likewise the collation of the image object with respect to the millimetric-wave object, the distance between the vehicle and the object, and the angle defined by the vehicle and the object are collated. In this example, the difference between the distance from the fetched image object to the vehicle and the distance from the closest millimetric-wave object to the vehicle is set as a threshold value in accordance with the accuracy of the stereo camera 3. Also the difference between the angle defined by the fetched image object and the traveling direction of the vehicle and the angle defined by the closest millimetric-wave object and the traveling direction of the vehicle is set as a threshold value in accordance with the accuracy of the stereo camera 3. If the aforementioned difference in the distance or in the angle is equal to or larger than the respective threshold value, the closest millimetric-wave object cannot be selected. If the closest millimetric-wave object is selected, the ECU 4 stores a pair of the fetched image object and the selected millimetric-wave object as an image base pair. The ECU 4 repeats the aforementioned collation with respect to the image objects by n_i times.

In the example shown in FIG. 2, when the image object I1 is fetched as the reference, the millimetric-wave object M1 is selected such that an image base pair IP1 is determined. When the image object I2 is fetched as the reference, the millimetric-wave object M2 is selected such that an image base pair IP2 is determined. When the image object I3 is fetched as the reference, the millimetric-wave object M5 is selected such that an image base pair IP4 is determined. When the image target object I4 is fetched as the reference, the millimetric-wave object M5 is selected such that an image base pair IP4 is determined. When the image object I5 is fetched as the reference, any one of the millimetric-wave target objects M1 to M5 cannot be selected to form the image base pair because each difference in the distance between the respective millimetric-wave objects M1 to M5 and the image object I5 exceeds the threshold value. When the image object I6 is fetched as the reference, any one of the millimetric-wave target objects M1 to M5 cannot be selected to form the image base pair because each difference in the distance between the respective millimetric-wave objects M1 to M5 and the image object I6 exceeds the threshold value.

The ECU 4 performs comparison between the millimetric-wave base pairs and the image base pairs sequentially so as to select the millimetric-base pair and the image base pair each including the identical millimetric-wave object and the image object. The ECU 4 further sets the selected combination of the millimetric-base pair and the image base pair each including the identical millimetric-wave object and the image object as a fusion pair (fusion object). Then the information with respect to the distance and the relative speed derived from the millimetric-wave object data, and the information with respect to the angle derived from the image object data is set as the fusion object information. In the ECU 4, the millimetric-wave objects that have not been selected as the fusion object is set as independent millimetric-wave objects, and the image objects that have not been selected as the fusion object is set as independent image objects, respectively.

In the example shown in FIG. 2, each of the millimetric-wave base pair MP1 and the image base pair IP1 includes the identical millimetric-wave object M1 and the image object I1, thus forming a fusion pair FP1. Each of the millimetric-wave base pair MP2 and the image base pair IP2 includes the identical millimetric-wave object M2 and the image object I2, thus forming the fusion pair FP2. Each of the millimetric-wave base pair N4 and the image base pair IP3 includes the identical millimetric-wave object M5 and the image object I3, thus forming the fusion pair FP3. The millimetric-wave base pair MP3 has no image base pair including the identical millimetric-wave object and the image object. The image base pair IP4 has no millimetric-wave base pair including the identical millimetric-wave object and the image object.

Figure 3:
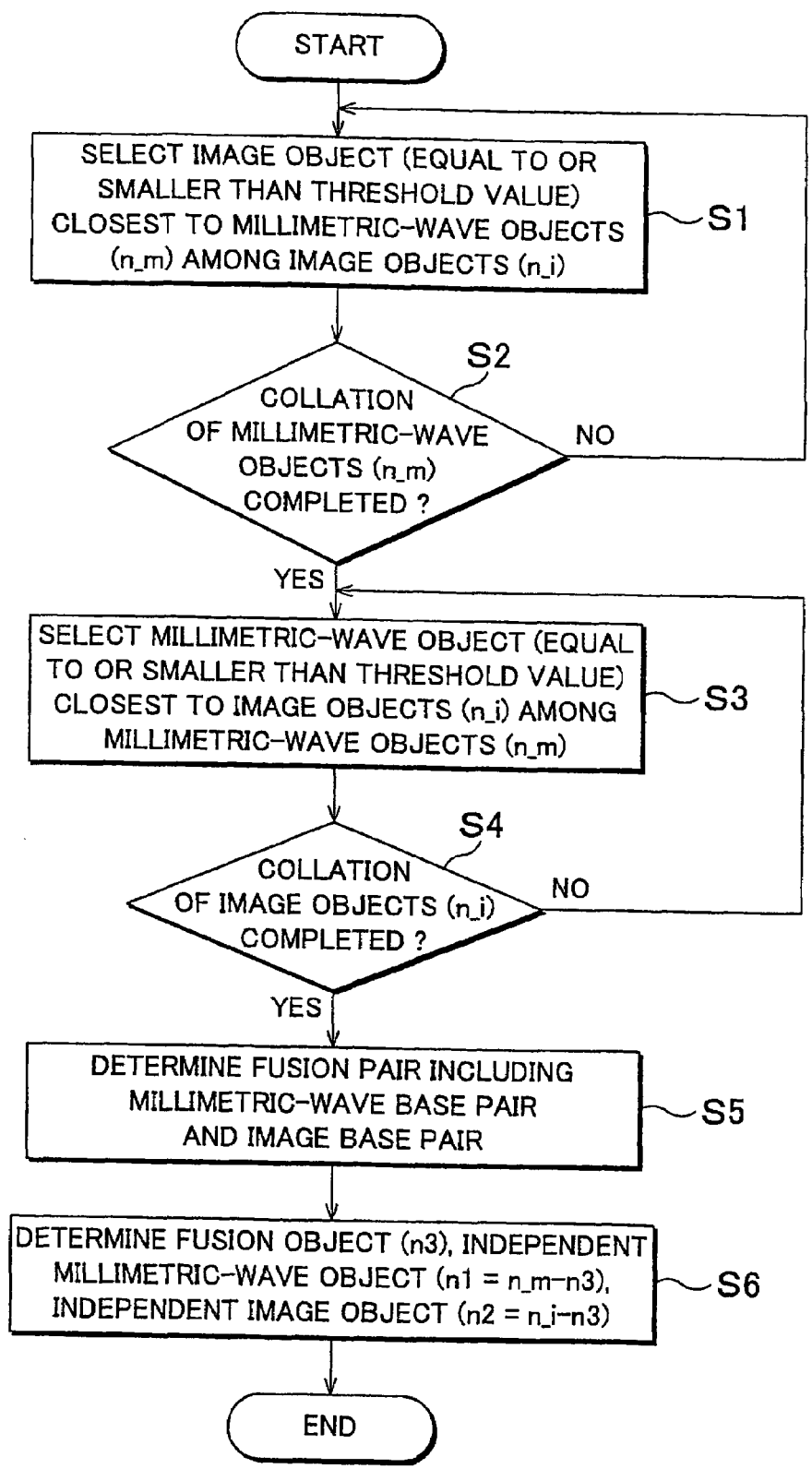
FIG. 3 is a flowchart representing a collating process executed by the obstruction detection system as shown in FIG. 1.

The collating process performed in the obstruction detection system 1 as shown in FIG. 1 will be described referring to a flowchart of FIG. 3. The flowchart of FIG. 3 represents the collating process performed by the obstruction detection system 1 as shown in FIG. 1.

The obstruction detection system 1 detects millimetric-wave objects (n_m objects) using the millimeter-wave radar 2 for detecting the object, and detects image objects (n_i objects) using the stereo camera 3 for detecting the object.

In step S1, in the obstruction detection system 1, each of the n_i image objects is collated with each of the millimetric-wave objects fetched as a reference sequentially, and the image object as being closest to the reference millimetric-wave object is selected. In the case where each difference in the distance and the angle with respect to the millimetric-wave object and the selected image object is equal to or smaller than each of the threshold values, the millimetric-wave base pair including the fetched millimetric-wave object and the closest image object is determined.

Then in step S2, it is determined whether collation of the n_i image objects with respect to the n_m millimetric-wave objects has been completed in the obstruction detection system 1. Step S1 is repeatedly executed until completion of the collating process. In this embodiment, each of the detection results of the stereo camera 3 is scanned based on the detection results of the millimeter-wave radar 2 such that one image object that is considered as being closest to the respective millimetric-wave objects is identified.

Then in step S3, each of the n_m millimetric-wave objects is collated with each of the image objects fetched as a reference sequentially, and the millimetric-wave object as being closest to the reference image object is selected. In the case where each difference in the distance and the angle with respect to the image object and the selected millimetric-wave object is equal to or smaller than each of the threshold values, the image base pair including the reference image object and the closest millimetric-wave object is determined.

The process proceeds to step S4 where it is determined whether collation of the n m millimetric-wave objects with respect to the n_i image objects has been completed in the obstruction detection system 1. Step S3 is repeatedly executed until completion of the collating process. In this embodiment, each of the detection results of the millimeter-wave radar 2 is scanned based on the detection results of the stereo camera 3 such that the millimetric-wave object that is considered as being closest to the respective image objects is identified.

In step S5, in the obstruction detection system 1, collation is performed between all the determined millimetric-wave base pairs and all the determined image base pairs so as to search a combination of the millimetric-wave base pair and the image base pair each having the identical millimetric object and the image object. If the aforementioned combination of the millimetric-wave base pair and the image base pair is searched in the obstruction detection system 1, such combination is determined as the fusion pair, and the fusion object information indicating the distance, relative speed, and the angle is set. In the obstruction detection system 1, two groups of the collation results, that is, the millimetric-wave base pair and the image base pair, derived from the bilateral collations between the millimetric-wave objects and the image objects are further collated. Only when each of those base pairs includes the identical millimetric-wave object and the image object, they are formed into the fusion objects.

In step S6, in the obstruction detection system 1, upon determination of the fusion objects (n3 objects), each number of the independent millimetric-wave objects (n1=n_m−n3) and the independent image objects (n2=n_i−n3) is obtained. In this way, the obstruction detection system 1 determines the fusion object, independent millimetric-wave object, and independent image object at every detection of the millimetric-wave object and the image object performed by the millimeter-wave radar 2 and the stereo camera 3, respectively.

In the obstruction detection system 1, bilateral collation between the millimetric-wave objects and the image objects is performed. In the case where the two kinds of such collation results coincide with each other, the preceding object is determined as the fusion object. The accuracy (fusion accuracy) in determining the coincidence of the objects detected by the image and the millimetric wave may be improved to substantially a high degree. In the obstruction detection system 1, one of the millimetric-wave object and the image object which is closest to the other object can be selected, and a combination of the millimetric-wave base pair and the image base pair each including the same objects can be searched through a simple method, thus reducing the processing load.

The obstruction detection system 1 allows collation between the detection results based on images of the preceding vehicle and the detection results using the millimetric wave. This may supply the obstruction information with high reliability to various types of operation support systems that appropriately support the vehicle operator to drive the vehicle.

As has been described with respect to the embodiment of the invention, it is to be understood that the invention is not limited to the aforementioned embodiment but may be embodied into various forms.

The embodiment of the invention is applied to the obstruction detection system that is provided in the vehicle. It may be applicable to various types of object detection, for example, contact-free detection.

The embodiment of the invention includes two types of detection units, that is, the millimeter-wave radar and the stereo camera. However, any other detection unit such as a laser radar may be employed. Further three or more detection units may also be employed.

In the embodiment of the invention, the position of each object is identified based on the distance, relative speed, and angle. However, other information such as two-dimensional coordinate system may be used for identifying the position of the respective objects.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An object detection system comprising:
   a radar detection unit that detects objects using a radar;
   an image detection unit that detects using an image; and
   a collating unit that performs collation between a detection result of the radar detection unit and a detection result of the image detection unit, wherein;
   the collating unit detects a combination of an object detected by the radar detection unit and an object selected among those detected by the image detection unit, which is the closest to the object detected by the radar detection unit, detects a combination of an object detected by the image detection unit and an object selected among those detected by the radar detection unit, which is the closest to the object detected by the image detection unit, determines whether there is a coincidence between the combination of the object detected by the radar detection unit and the selected object as being closest thereto and the combination of the object detected by the image detection unit and the selected object as being closest thereto, and determines, when there is the coincidence, that the object detected by the radar detection unit is the same as the object detected by the image detection unit.

2. The object detection system according to claim 1, wherein the radar detection unit comprises at least one of a millimeter-wave radar and a laser radar.

3. The object detection system according to claim 1, wherein the image detection unit comprises a stereo camera.

4. A method of detecting an object in a system including a radar detection unit that detects objects using a radar, an image detection unit that detects objects using an image, and a collating unit that performs collation between a detection result of the radar detection unit and a detection result of the image detection unit,
   the method comprising the steps of;
   detecting a combination of an object detected by the radar detection unit and an object selected among those detected by the image detection unit, which is the closest to the object detected by the radar detection unit,
   detecting a combination of an object detected by the image detection unit and an object selected among those detected by the radar detection unit, which is the closest to the object detected by the image detection unit,
   determining whether there is a coincidence between the combination of the object detected by the radar detection unit and the selected object as being closest thereto and the combination of the object detected by the image detection unit and the selected object as being closest thereto, and;
   determining, when there is the coincidence, that the object detected by the radar detection unit is the same as the object detected by the image detection unit.

5. The method according to claim 4, wherein the radar detection unit comprises at least one of a millimeter-wave radar and a laser radar.

6. The method according to claim 4 or 5, wherein the image detection unit comprises a stereo camera.

* * * * *

UNITED STATES PATENT AND TRADEMARK OFFICE
CERTIFICATE OF CORRECTION

PATENT NO. : 7,358,889 B2  Page 1 of 1
APPLICATION NO. : 10/560307
DATED : April 15, 2008
INVENTOR(S) : Kyoichi Abe et al.

It is certified that error appears in the above-identified patent and that said Letters Patent is hereby corrected as shown below:

Claim 1, col. 9, line 44, "detects using" should read -- detects objects using --.

Claim 3, col. 10, line 17, "claim 1," should read -- claim 1 or 2, --.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO.       : 7,358,889 B2                                              Page 1 of 1
APPLICATION NO.  : 10/560307
DATED            : April 15, 2008
INVENTOR(S)      : Kyoichi Abe et al.

It is certified that error appears in the above-identified patent and that said Letters Patent is hereby corrected as shown below:

Title Page, item (73), "Assignee: Toyota Jidosha Kabushiki Kaishi" should read --Toyota Jidosha Kabushiki Kaisha--.

Signed and Sealed this

Twenty-third Day of December, 2008

JON W. DUDAS
*Director of the United States Patent and Trademark Office*